«12» United States Patent  (10) Patent No.: US 7,762,712 B2
Fleury  (45) Date of Patent: Jul. 27, 2010

(54) METHOD FOR THE CONTINUOUS PHASE CONVERSION OF A PRODUCT

(75) Inventor: Pierre-Alain Fleury, Ramlinsburg (CH)

(73) Assignee: List Holding AG, Arisdorf (CH)

( * ) Notice: Subject to any disclaimer, the term of this patent is extended or adjusted under 35 U.S.C. 154(b) by 1025 days.

(21) Appl. No.: 10/543,413

(22) PCT Filed: Jan. 26, 2004

(86) PCT No.: PCT/EP2004/000616

§ 371 (c)(1),
(2), (4) Date: Nov. 10, 2005

(87) PCT Pub. No.: WO2004/067157

PCT Pub. Date: Aug. 12, 2004

(65) Prior Publication Data

US 2006/0193197 A1    Aug. 31, 2006

(30) Foreign Application Priority Data

Jan. 27, 2003    (DE) ................................ 103 03 167

(51) Int. Cl.
*B29B 7/38*    (2006.01)
(52) U.S. Cl. ........................... 366/97; 366/142; 366/601
(58) Field of Classification Search ................... 366/79, 366/97, 142, 601
See application file for complete search history.

(56) References Cited

U.S. PATENT DOCUMENTS

| 3,447,201 | A | * | 6/1969 | Seanor et al. | 366/76.2 |
| 4,443,110 | A | * | 4/1984 | den Otter | 366/97 |
| 4,818,113 | A | * | 4/1989 | Patel | 366/76.2 |
| 5,345,781 | A | * | 9/1994 | Fels et al. | 62/343 |
| 5,727,876 | A | * | 3/1998 | Tynan | 366/85 |
| 5,873,654 | A | * | 2/1999 | Lu | 366/84 |
| 6,129,450 | A | * | 10/2000 | Braun | 366/83 |

FOREIGN PATENT DOCUMENTS

| DE | 2 349 106 | 4/1975 |
| DE | 195 36 944 | 3/2000 |
| DE | 100 08 531 | 8/2001 |
| EP | 0 457 086 | 11/1991 |
| EP | 0 517 068 | 12/1992 |

* cited by examiner

*Primary Examiner*—David L Sorkin
(74) *Attorney, Agent, or Firm*—Bachman & LaPointe, P.C.

(57) ABSTRACT

A method for the continuous phase conversion of a product in a kneader mixer, into which the product is introduced, said mixer comprising kneading elements that are mounted on at least one shaft. The product is back-mixed until a predefined viscosity of the product is determined by measurement of the torque of the shaft, or a product with a predetermined viscosity that has already been achieved is back-mixed, the kneader mixer is then switched to a continuous mode, in which optionally and additional component is added and the product is subsequently transported to the discharge point.

3 Claims, No Drawings

METHOD FOR THE CONTINUOUS PHASE CONVERSION OF A PRODUCT

BACKGROUND OF THE INVENTION

The invention relates to a method for the continuous phase transformation of a product in a mixer-kneader into which the product is introduced, said mixer-kneader comprising kneading elements on at least one shaft.

Plug flow takes place in a continuous mixer-kneader, with a concentration profile over the length of the kneader and a homogeneous phase state for each axial position of the product. At the beginning of the kneader, after the entrance, for example, the material to be processed has a low viscosity since it contains a great deal of liquid, in particular solvent. Evaporation takes place only through contact with heat-exchange surfaces, these surfaces being limited as a rule to the inner wall of the kneader, the surface of the shaft and possibly also the surface of corresponding disk elements. Examples of such kneaders are described in DE 23 49 106 C, EP 0 517 068 A or DE 195 36 944 A. The list could be continued indefinitely.

EP 0 457 086 A2 describes a screw machine having means for the combined determination of the integral torque and of the torque input locally in certain sections of the product space. The measurement of the local moment provides information about the local torque input in the product space to the transported product. The local viscosity is also determined and can be calculated by means of the calculated torque curve and by means of at least one viscosity measurement. It provides information about the rheology properties of the product in the process space. The course of the chemical reactions in the process space is evaluated by means of the viscosity. It is also proposed to use the viscosity as a controlled variable, but this is effected by changing the viscosity according to the desired product qualities.

DE 100 08 531 A discloses a method for the continuous evaporation or for the thermal treatment of viscous products, in particular elastomers and thermoplastics, in a mixer-kneader comprising at least one stirring shaft equipped with mixing or kneading elements, fresh low-viscosity product solution being mixed into a preconcentrated, viscous product bed so that the viscosity and concentration of this product bed is adjusted so that the energy input, consisting of mechanical kneading energy and heat transfer via contact with the kneader heat-exchange surface, is maximum. It is also intended, inter alia, that the product be continuously back-mixed in the mixer-kneader. In this case, the main proportion of solvent (monomer, liquid) is evaporated owing to the kneading energy.

The heat transfer coefficient of such heat-exchange surfaces is low, especially if, for example, a foam forms between material and heat-exchange surface, and the specific heating area is unfavorable.

The evaporation then starts to become more efficient if the material is more viscous, if, for example, the proportion of solvent decreases below 20%. It now becomes easier to introduce the necessary kneading energy into this more pasty material, which energy is converted into heat. The question therefore arises as to the procedure to be adopted in a mixer-kneader so that the proportion of solvent is reduced as quickly as possible to a range in which the introduction of kneading energy becomes efficient.

It is the object of the present invention once again substantially to improve the mode of operation of the mixer-kneader and to make it more efficient.

SUMMARY OF THE INVENTION

The object is achieved if back-mixing of the product is continued until a predetermined viscosity of the product is determined by measurement of the torque of the shaft, at which viscosity the back-mixing kneading elements introduce mechanical energy into a plastics solution (e.g. thermoplastic or elastomeric solution) in order to realize the phase transformation of the metered-in volatile component(s) from liquid to gas, or back-mixing of a product having an already achieved predetermined viscosity is effected, whereupon the mixer-kneader is switched to a continuous mode in which optionally addition of a further component is effected and the product is conveyed to the discharge.

This means that only one predetermined, advantageous viscosity with a certain proportion of solvent is important for the kneader itself, since it is only there that the kneading energy is introduced into the material. As a result of this, the total evaporation unit can be made substantially more compact.

DETAILED DESCRIPTION

The present invention is not limited to a certain mixture. The invention is applicable to all mixtures of solid and liquid. In order for it to operate, all that is necessary is that the viscosity reaches a degree which is sufficiently high to be able to introduce sufficient kneading energy.

By means of the present invention, a phase transformation from solid to liquid is also possible. For example, the method according to the invention can also be used for the production of crumb. For example, milk powder, sugar, cocoa, oil and water are mixed with one another and thermally treated. During the thermal treatment, a reaction, the crystallization of sugar and the evaporation of water take place. The method can readily be carried out in one of the above-mentioned kneaders. The only difficulty arises in the case of the phase transformation of the mixture from powder to a pasty material. In the powder state, the heat transfer through contact with the wall is very low. Furthermore, it is also possible to introduce a kneading energy into the material because the viscosity of the powder is extremely low.

As a result of the proposed back-mixing an upstream single- or twin-screw kneader or in a first zone of a kneader, however, it is possible to introduce the components to be metered directly into a pasty material. In other words, a pasty material is back-mixed in the kneader and the solid is metered into the pasty material. Since the material now has sufficient viscosity, the corresponding kneading energy can also be introduced into the material by further kneading. This takes place in particular with respect to the internal energy since the heating of the product also takes place in the interior of the pasty material.

This pasty material is then introduced into a continuously operating standard mixer and is simply conveyed onward into a second zone of a continuous kneader. There, the above-mentioned reaction/crystallization/drying is carried out.

In a preferred embodiment of the method, it is also intended to use the method in the recycling of materials. Recycling of polyamide carpet is mentioned merely by way of example. The carpet residues are metered directly into a back-mixed, pasty polyamide material. The internal energy then required for heating the solid to the melting point can then be introduced sufficiently by means of the kneading.

There are also cases where the torque is too high. Flash evaporation of, for example, polyol solutions (sugar substitute, such as palatinite, sorbitol) or polymerizations (for example of PMMA) below the glass transition temperature/ melting point may block a continuous kneader with plug flow. In these cases, the phase transformation from liquid to solid phase during plug flow is characterized by excessively high viscosities. The difficulty is to knead the homogeneous highly viscous material locally over the length of the apparatus.

A preliminary bed/stirred bed/fixed bed comprising the prepared flowable product can eliminate the excessively high viscosities. A liquid product is metered onto this flowable granular preliminary bed/stirred bed/fixed bed. As a result of the back-mixing, the viscous phase takes place only at the surface of the particles of the prepared product, but the entire stirred bed is always stirrable. The stirring element no longer "sees" the high viscosity of the viscous phase. The phase transformation from viscous/liquid to solid takes place on the surface of the particles of the prepared product, owing to the back-mixing. As a result of the back-mixing, the mixture of viscous product and solid granular product has an apparently low viscosity.

The continuous back-mixing can be effected by means of feed points distributed over the length of the kneader and by means of a positive conveying kneading geometry.

Instead of the feed points distributed over the length, the desired back-mixing can also be realized by only one feed point with external recycling of prepared product. The kneading geometry is to be realized as above with positive conveying.

The third variant for creating continuous back-mixing in a kneader is the combination of a single feed point over the length with a back-mixing kneading geometry.

Of course, the corresponding mixer-kneaders for back-mixing are designed for a continuous mode of operation. It is unimportant whether the mixer-kneader is equipped with one screw or two screws. It is possible to design the corresponding kneading elements so that they have back-mixing geometry.

The invention claimed is:

1. A method for the continuous phase transformation of a product in a mixer-kneader comprising the steps of:
providing a mixer-kneader having at least one shaft provided with kneading elements;
feeding into the mixer-kneader a solution to be mixed and transformed into a product;
kneading the solution by turning the at least one shaft;
measuring the at least one shaft's torque during kneading and back-mixing of a product;
determining when viscosity of the product is equivalent to a predetermined acceptable viscosity from the at least one shaft's measured torque;
switching the mixer-kneader to a continuous mode once acceptable viscosity is determined; and
discharging the product from the mixer-kneader.

2. The method as claimed in claim 1, wherein the kneading elements introduce mechanical energy into a first zone of the mixer-kneader and positively convey for further treatment of the product in a second zone of the mixer-kneader.

3. The method as claimed in claim 1, wherein back-mixing kneading elements form a fixed bed in a first zone of the mixer-kneader, and positively convey for further treatment of the product in a second zone of the mixer-kneader.

* * * * *